10/?/85 OR 4,545,845

United States Patent [19]

Biewald et al.

[11] Patent Number: 4,545,845

[45] Date of Patent: Oct. 8, 1985

[54] MACHINE FOR ASSEMBLING VENEER STRIPS

[76] Inventors: Heinz Biewald, Zum Galgenkamp 72, 4840 Rheda-Wiedenbrück; Theo Grönebaum, Eschenweg 24a; Hans-Heinrich Kuper, Oesternforth 28, both of 4835 Rietberg, all of Fed. Rep. of Germany

[21] Appl. No.: 577,716

[22] Filed: Feb. 7, 1984

[30] Foreign Application Priority Data

Feb. 9, 1983 [DE] Fed. Rep. of Germany ....... 3304315
Jul. 12, 1983 [DE] Fed. Rep. of Germany ....... 3325050

[51] Int. Cl.[4] .............................................. B32B 31/12

[52] U.S. Cl. ................................ 156/544; 156/304.1; 156/304.3; 156/546

[58] Field of Search ............... 156/544, 546, 547, 550, 156/304.3, 304.1, 304.5, 304.6

[56] References Cited

U.S. PATENT DOCUMENTS

| | | | |
|---|---|---|---|
| 2,351,946 | 6/1944 | Friz | 156/546 |
| 2,801,657 | 8/1957 | Chrisawn | 156/546 |
| 3,445,313 | 5/1969 | Clausen et al. | 156/544 |
| 3,562,069 | 2/1971 | Ortel | 156/546 |
| 3,579,405 | 5/1971 | Crawford | 156/546 |
| 3,580,792 | 5/1971 | Kvalheim et al. | 156/546 |

*Primary Examiner*—Caleb Weston
*Attorney, Agent, or Firm*—Dennison, Meserole, Pollack & Scheiner

[57] ABSTRACT

In a machine for assembling veneer strips in transit on a machine table, said machine comprising conveying means, preferably driven conveyor discs, which are mounted in the machine frame and gather together the veneer strips by their butt edges, and said machine also comprising a feed device for supplying adhesive filament, such feed device applying an adhesive filament to the upper surface of the two veneer strips in an undulatory or zigzag manner over the butt edge region, the improvement comprising a spreading device, which coats the lateral longitudinal edges (butt edges) of the veneer strips with glue, disposed on the machine frame in front of the filament feed device when viewed in the conveying direction of the veneer strips, and at least one hot air nozzle disposed behind said spreading device in front of the filament feed device.

7 Claims, 13 Drawing Figures

MACHINE FOR ASSEMBLING VENEER STRIPS

BACKGROUND OF THE INVENTION

The invention relates to a machine for assembling veneer strips as they pass along a machine table, said machine comprising conveying means, preferably driven conveyor discs, which are mounted in the machine frame and gather together the veneer strips by their butt edges; and said machine also comprising a feed device for supplying adhesive filament, such feed device applying an adhesive filament to the upper surface of the two veneer strips in an undulatory or zigzag manner over the butt edge region.

The invention seeks to improve such a machine in simple manner so that, in addition to the veneers being joined together by the adhered connecting filaments in the butt edges of the veneer strips, an additional join is made which prevents the butt joints from expanding even if the assembled veneer strips become deformed in corner or curved regions. For this purpose, the machine is to be provided with means which are easy to attach and operate reliably.

The machine should have easy access to the glue spreading device, so that its tools can be easily cleaned or replaced without other component parts of the machine having to be removed. The glue spreading device should be capable, therefore, of being serviced in a short space of time outside its sphere of operation, and the veneer strips which are disposed on the worktable can thus remain in their positions. For the brief servicing procedure, therefore, there is only a brief interruption in the movement of the veneer strips. In addition, the glue spreading device should permit the glue to be well distributed over the tools, which are provided for spreading purposes, without there being a need for a separate drive motor.

Finally, the invention should provide a tool carrier for the glue spreading device of the machine, such a tool carrier being adapted so that dirt cannot contaminate the bearings and driving cogwheels of the glue spreading discs and so that the glue spreading discs can easily be cleaned or replaced. The component parts of the tool carrier should be prevented from becoming dirty due to accurate metering of the glue, whereby the conduits and chambers conducting the glue are to be well sealed.

SUMMARY OF THE INVENTION

According to the invention, the object is achieved in that a spreading device, which coats the lateral longitudinal edges (butt edges) of the veneer strips with glue, is disposed on the machine frame in front of the filament feed device when viewed in the conveying direction of the veneer strips, and at least one hot air nozzle is disposed behind said spreading device in front of the filament feed device.

The glue spreading device preferably comprises a lowerable tool carrier which is disposed beneath the machine table and is horizontally displaceable from the region of the machine table at right angles to the feed direction of the veneer strips, whereby the tool carrier, in the operating position, is supported on the free end—provided with a supporting roller—of the piston rod of a pressure medium cylinder which is vertically retained on the machine frame. The tool carrier is pivotally connected to two horizontal connecting rods—disposed at right angles to the feed direction of the veneer strips—via two identical link parallelograms, each comprising a lower link rod and an upper link rod. In this way, the glue spreading device can be easily removed from the sphere of activity, once its tools have been lowered, by pulling a handle—similar to a drawer—beneath the machine table, whereupon the tool carrier, its tools and the glue supplying means become exposed for servicing purposes.

Each connecting rod is preferably axially displaceably mounted in two sliding bushes which are retained by two fixed webs spaced one behind the other at right angles to the feed direction of the veneer strips, whereby each of two glue spreading discs retained in the tool carrier is connected, via a gear mounted on the tool carrier and via a universal joint shaft, to a drive shaft—in the form of a splined shaft—which is rotatably and axially displaceably mounted on the webs.

Each glue spreading disc is preferably mounted in a bearing sleeve which is appropriately inserted into a bore in the tool carrier—in the form of a solid, integral bearing body—and is detachably secured therein, whereby the bearing sleeve, having a flange disposed at its outer end, is provided in the inclined surface of the bearing body. In such case, the bearing sleeve is secured to the bearing body by means of a plurality of flange screws. This arrangement permits the entire bearing sleeve to be rapidly detached and removed from the bearing body, so that the glue spreading disc, retained by the bearing sleeve, can be cleaned from all sides. After the cleaning process, the bearing sleeve can then be easily secured again in the bearing body, together with the glue spreading disc. If the time required to inspect the glue spreading disc is to be kept as short as possible, it is also possible, after removal of the bearing sleeve, to insert another available bearing sleeve together with a glue spreading disc, whereupon the tool carrier is again made available for further processing.

The machine according to the invention is provided with an additional glue spreading device which applies glue to the butt edges of the veneer strips as the veneer strips pass along the table prior to the connecting filament being adhered thereto, so that, in addition to the veneers being joined together by means of the connecting filament adhered to the surface, the butt edges are joined together by glue.

The plate-shaped conveyor discs gather the veneers firmly together by their butt edges, and the adhered connecting filament then holds the veneers securely together to allow the glue to harden. This additional glue joint eliminates the possibility of the veneers adjacent the butt edge expanding even if the veneers become deformed at corners or curves. A white glue is preferably used as the glue, since white glue takes up paints and varnishes, with the result that uniform colouring is possible, even in the butt edges.

Since the glue requires a certain amount of time for bonding, the spreading device is provided with at least one hot air nozzle which acts on the glue in the butt edge region and effects preliminary bonding so that, when the veneers are drawn together, a favourable adhesive force is achieved. The machine is simply and economically constructed and exhibits a systematic mode of operation, thereby permitting excellent veneered panels to be produced.

DESCRIPTION OF PREFERRED EMBODIMENTS

Figure 1:
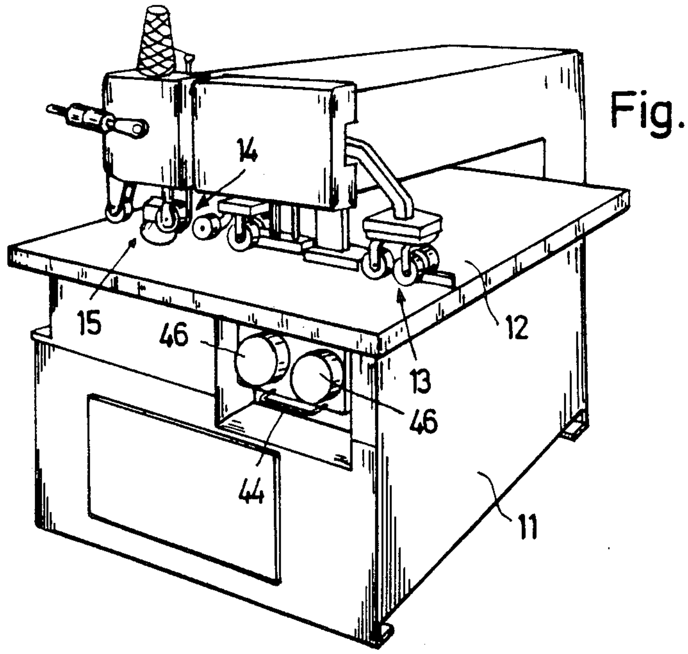
FIG. 1 is a perspective view of a machine.
Figure 2:
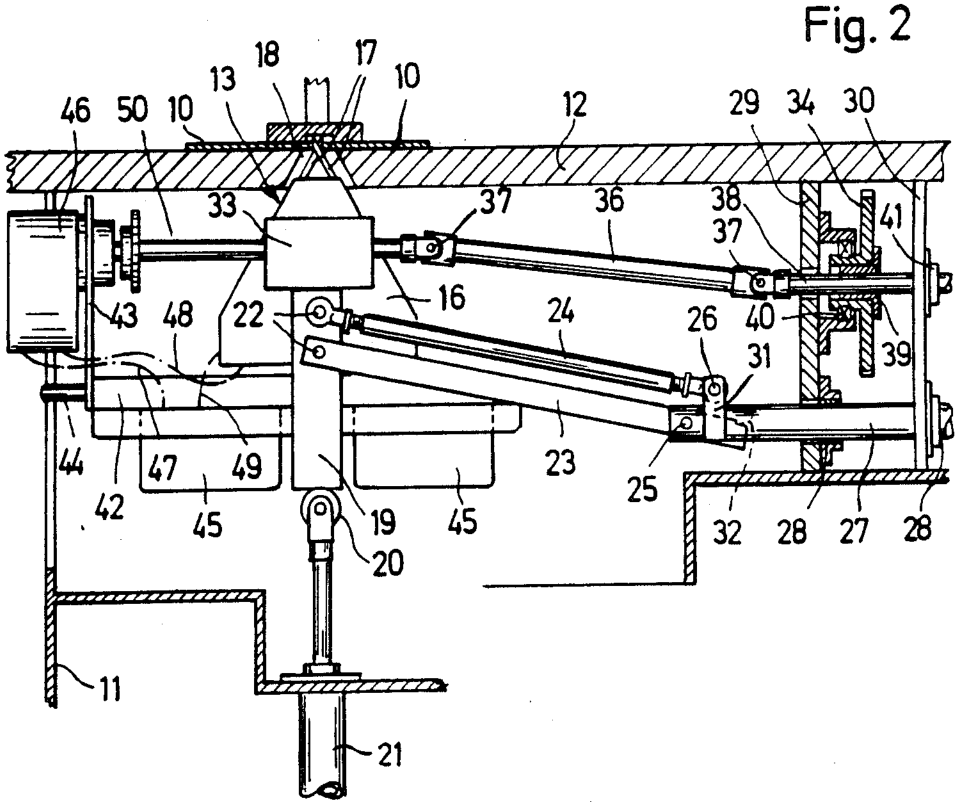
FIG. 2 is a vertical sectional view, taken transversely to the feed direction of the veneer strips, through the glue spreading device installed in the machine illustrated in FIG. 1.
Figure 3:
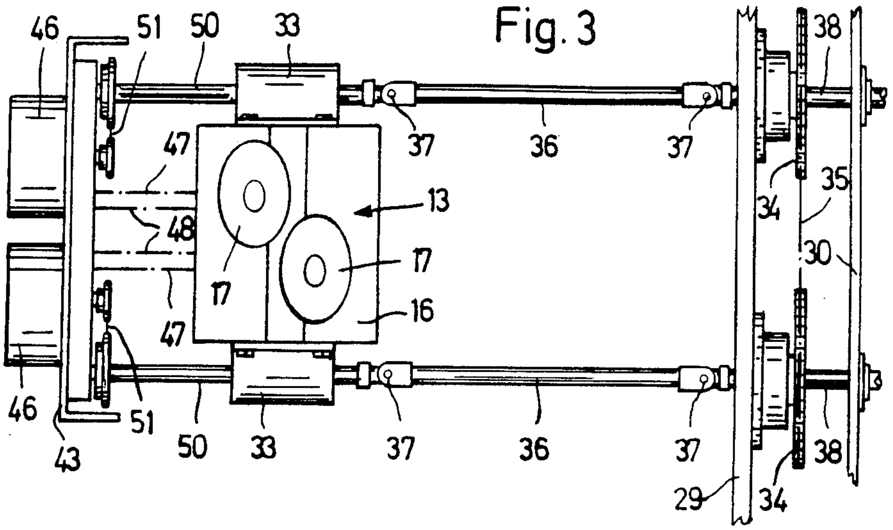
FIG. 3 is a schematic plan view of the glue spreading device.
Figure 4:
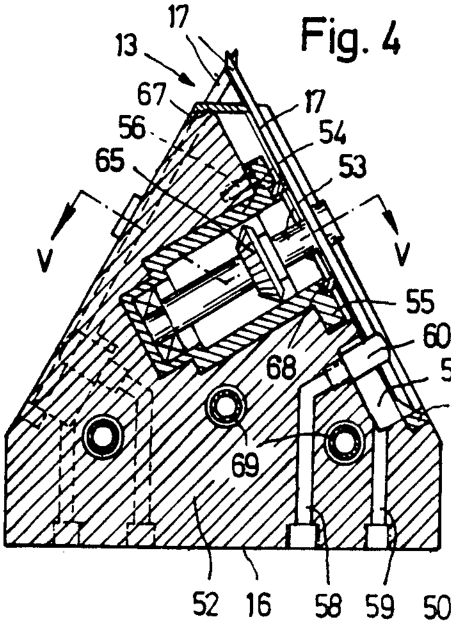
FIG. 4 is a vertical sectional view, taken transeversely to the feed direction of the veneer strips, through a tool carrier of the glue spreading device.
Figure 5:
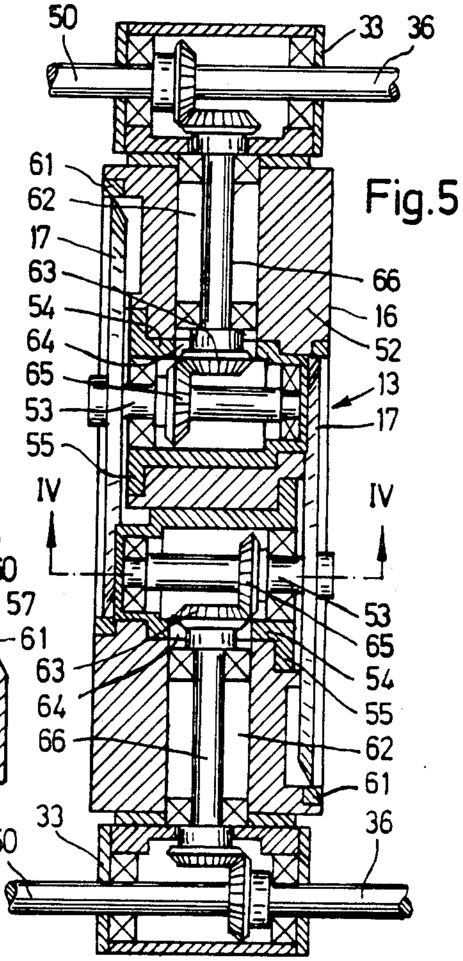
FIG. 5 is a sectional view, taken along the line V—V of FIG. 4, through the tool carrier of the glue spreading device.

The machine for assembling veneer strips 10 includes a machine table 12, mounted on a machine frame 11, and a plurality of devices—a glue spreading device 13, a feed device 14 for supplying adhesive filament, and a conveyor device 15 for conveying the veneer strips 10—disposed in a straight line one behind the other, some being below the machine table and some being above the machine table.

The veneer strips 10 are laid on the machine table 12 in pairs, and the two opposite lateral longitudinal edges or butt edges are coated with glue by the glue spreading device 13. As they are conveyed further, the two veneer strips 10 pass beneath the feed device 14 for supplying adhesive filament and enter the conveying means 15 where they are gathered together by their glued butt edges. The feed device applies, in transit, an adhesive filament to the surface of the two veneer strips 10—which have been brought together—in undulatory or zigzag manner. After this adhesive filament has been applied, the veneer strips 10 are held together by the adhesive filament and by the glue between their parting line.

The glue spreading device 13 includes a tool carrier 16 disposed beneath the machine table 12, two glue spreading discs 17 having inclined axles and being rotatably mounted in said tool carrier 16 so that their upper peripheral region protrudes through a slot 18 formed in the machine table 12, into the region of the butt edges of the veneer strips 10. When viewed in the feed direction, the two glue spreading discs 17 are in staggered arrangement one behind the other, so that they are not mutually obstructed at the veneer strips 10. It would also be possible to dispense glue with just one single disc. The peripheral speed of the glue spreading discs 17 corresponds to the speed for feeding the veneer strips 10.

The tool carrier 16 is secured to a vertical longitudinal carrier 19 which is supported on a supporting roller 20. Said supporting roller 20 is mounted on the free end of the piston rod of a vertical pressure medium cylinder 21 secured to the machine frame 11, so that the tool carrier 16 is raised when the piston rod travels out of the pressure medium cylinder 21, but the tool carrier 16 is lowered when the piston rod travels into the pressure medium cylinder 21. Two parallel link parallelograms are pivotally connected to the longitudinal carrier 19 in pivots 22, said parallelograms being pivotable in vertical planes extending transversely to the feed direction of the veneer strips 10, and said pivots 22 retaining the vertically displaceable tool carrier 16 in all its positions. Each link parallelogram comprises a lower link rod 23 and an upper link rod 24.

Each of the respective ends of the link rods 23 and 24 remote from the pivots 22 of the longitudinal carrier 19 is pivotally connected to a horizontal connecting rod 27 via pivots 25 and 26, respectively. The two parallel connecting rods 27 can be axially displaced transversely to the feed direction of the veneer strips 10. In such case, the connecting rods 27 are displaceably mounted in sliding bushes 28 of a front web 29 and a rear web 30. In the region of bores formed in the webs 29 and 30, the sliding bushes 28 are secured to said webs 29 and 30, whereby the connecting rod 27 is passed through the bores. The pivot 25 of each connecting rod 27 for the lower link rod 23 is always directly provided at the connecting rod 27, whilst the pivot 26 for the upper connecting rod 24 is connected to the connecting rod 27 via a bearing lug 31. A respective projection is provided at the connecting rod 27, and the lower link rod 23—having a recess 32 formed therein—abuts against said projection when the lower link rod 23 adopts its horizontal position. In this way, the downward movement of the tool carrier 16 is limited. When the lower link rods 23 are horizontal, the lower end position of the tool carrier 16 is reached.

Two gears 33 are disposed on the ends of the tool carrier 16 for driving the glue spreading discs 17. Each glue spreading disc 17 is driven by its adjacent gear 33 which receives its torque from a drive wheel 34 mounted on the front web 29. The two drive wheels 34 for driving the glue spreading discs 17 are connected to each other by a chain drive 35 so that the drive wheels have the same speeds. Each drive wheel 34 is connected to its gear 33 via a universal joint shaft 36 which is pivotable in the same vertical plane as the link parallelogram, disposed therebeneath, at one end of the tool carrier 16 or longitudinal carrier 19. Each universal joint shaft 36 is connected, via cross-linkages or universal joints 37, to the drive shaft of the associated gear 33, at one end, and to a splined shaft 38, at the other end, said splined shaft 38 being axially displaceably mounted in a splined bush 39. The splined bush 39 is secured to the associated drive wheel 34 which is rotatably mounted in a bearing 40 for the front web 29. The splined shaft 38 also has a second mounting arrangement, namely in sliding bushes 41 on the rear web 30, so that it is mounted in an axially displaceable manner. The splined shaft 38 extends through a bore formed in the front web 29 in the region of the bearing 40.

A horizontal transverse carrier 42 is secured to the vertical longitudinal carrier 19 of the tool carrier 16, said transverse carrier 42 retaining a vertical carrier plate 43, which extends parallel to the feed direction of the veneer strips 10, on the side of the tool carrier 16 remote from the universal joint shafts 36. By means of a handle 44 disposed on the carrier plate 43 on the outer surface of the machine, the entire glue spreading device can be extracted from the machine transversely to the feed direction of the veneer strips 10. This movement is determined by the mounting arrangement of the connecting rods 27 and the splined shafts 38.

In addition, the transverse carrier 42 carries two glue containers 45 and two glue feed pumps 46 which are disposed on the outer surface of the carrier plate 43 and draw glue from the glue containers 45 by means of suction lines 47, said feed pumps 46 supplying the glue, via pressure lines 48, to the glue spreading discs 17 in the tool carrier 16. Surplus glue is returned to the glue containers 45 via overflow lines 49.

The glue feed pump 46 is driven by the gears 33, whereby each gear 33, which is driven by the universal joint shaft 36, drives the glue feed pump 46 associated therewith via a drive shaft 50 and a chain drive 51. No separate drive for driving the glue feed pumps 46 is necessary, therefore, since they also receive their torques from the drive wheels 34 via the gears 33.

The tool carrier 16 includes a solid bearing body 52 which has two upper inclined surfaces extending in the feed direction of the veneer strips 10, the glue spreading discs 17 being staggered one behind the other on said surfaces. Each glue spreading disc 17 is secured to one end of a shaft 53 mounted in a bearing sleeve 54. Said sleeve 54 is appropriately inserted into a bore extending from an inclined surface of the bearing body 52, and said sleeve 54 is provided with a flange 55 which is disposed on the surface of the bearing body 52 and is screw-connected to the bearing body 52 by means of a plurality of flange screws 56.

In its lower peripheral region, each glue spreading disc 17 forms, with the bearing body 52, a glue chamber 57 which is connected to the pressure line 48 of the glue feed pump 46 via a supply conduit 58 disposed in the bearing body 52. In addition, a discharge conduit 59 is disposed in th bearing body 52 and discharges into the glue chamber 57, said discharge conduit 59 being connected to the externally sealed glue container 45 and, via said container 45, to the suction line 47 of the glue feed pump 46. During operation, therefore, the glue feed pump 46 pumps glue from the glue container 45, through the supply conduit 58, into a glue nozzle 60 which is disposed inside the glue chamber 57 and supplies glue to the glue spreading disc 17 in the lower peripheral region.

Surplus glue drops from there in the glue chamber 57 down to the discharge conduit 59 and is sucked back into the glue container 45. The glue chamber 57 is externally sealed by means of a sealing ring 61 which encircles the periphery of the glue spreading disc 17, apart from the upper peripheral region which is intended for dispensing glue to the veneer strips 10.

The two glue spreading discs 17 are synchronously driven by the gears 33, and from each gear 33, a mounted shaft 66—disposed in a bore 62 formed in the bearing body 52—extends to the bearing sleeve 54 of the associated glue spreading disc 17. A bevel gear 63 is disposed at this end of the shaft 66 and is located within a radial bore 64 formed in the bearing sleeve 54, said bevel gear 63 engaging, within the bearing sleeve 54, with a bevel gear 65 for the shaft 53 of the glue spreading disc 17.

The arrangement whereby the actual driving means for each glue spreading disc 17 are disposed within a bearing sleeve 54 and a bore 62 in the bearing body 52 ensures that, when the glue spreading discs 17 are in the process of being easily replaced, glue does not impair their driving action, so that operational malfunctions need not be feared on these grounds.

In the upper peripheral region of the glue spreading discs 17, there is a cover and scraper plate 67 disposed on the bearing body 52. A sealing ring 68 is disposed between each glue spreading disc 17 and the flange 55 of its bearing sleeve 54. A fusion adhesive may be located in the glue chamber 57, and such adhesive is heated by heating cartridges 69 disposed within the bearing body 52. If other adhesives are used, cooling lines may also be provided instead of the heating cartridges 69. The entire glue chamber is simultaneously substantially sealed by means of the cover and scraper plate 67, so that the possibility of its components evaporating is largely excluded.

In the embodiment illustrated in FIGS. 6 to 13 of the drawing, the machine frame 70 of the veneer assembling machine has a horizontal supporting and conveying surface 71 for the veneers 72 which are to be joined together. Conveyor means 73, preferably motor-driven conveyor discs, are mounted in this supporting and conveying surface 71 and cause the veneers 72 to be drawn together by their butt edges 74 once they have left the vertical guide rail 75. A feed device 76 for supplying connecting filament is disposed on the machine frame 70 above the conveyor discs 73, and said feed device 76 applies a connecting filament 77, preferably a fibreglass filament, to the upper surface of the veneer in undulatory or zigzag manner over the butt region 74 of the veneer. A pressure roller 78 presses the veneers 72 against the conveyor discs 73.

Figure 6:
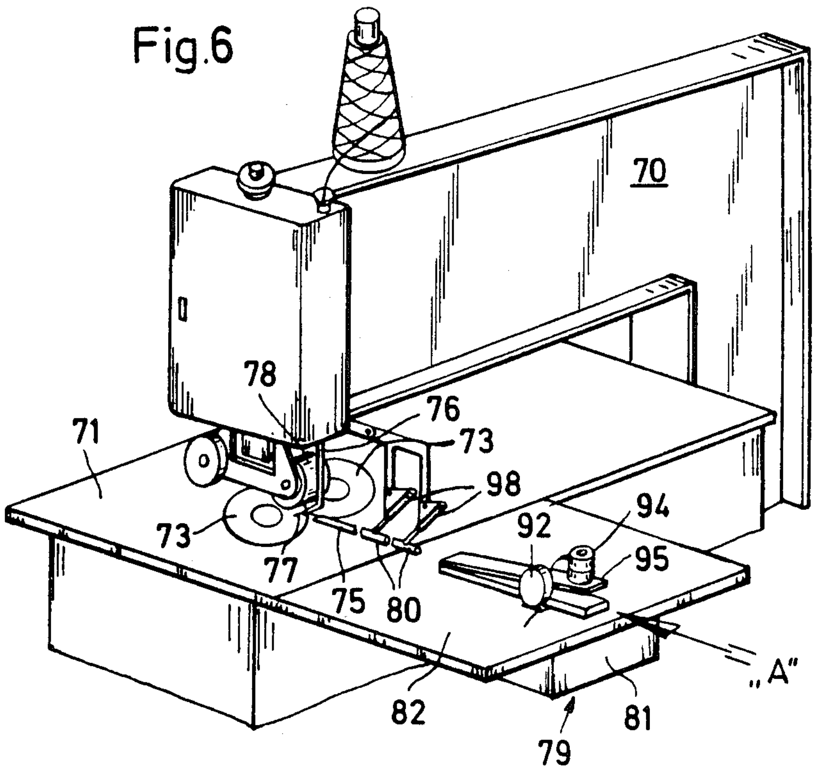
FIG. 6 is a perspective view of another veneer assembling machine having a glue spreading device with hot air nozzles.
Figure 7:
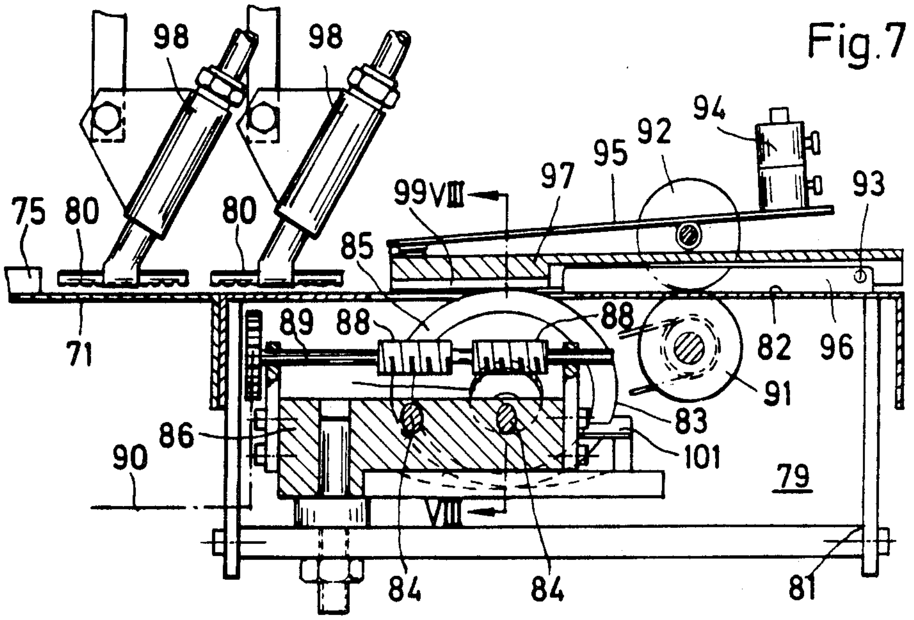
FIG. 7 is a vertical sectional view through the glue spreading device, taken along the line VII—VII of FIG. 8.
Figure 8:
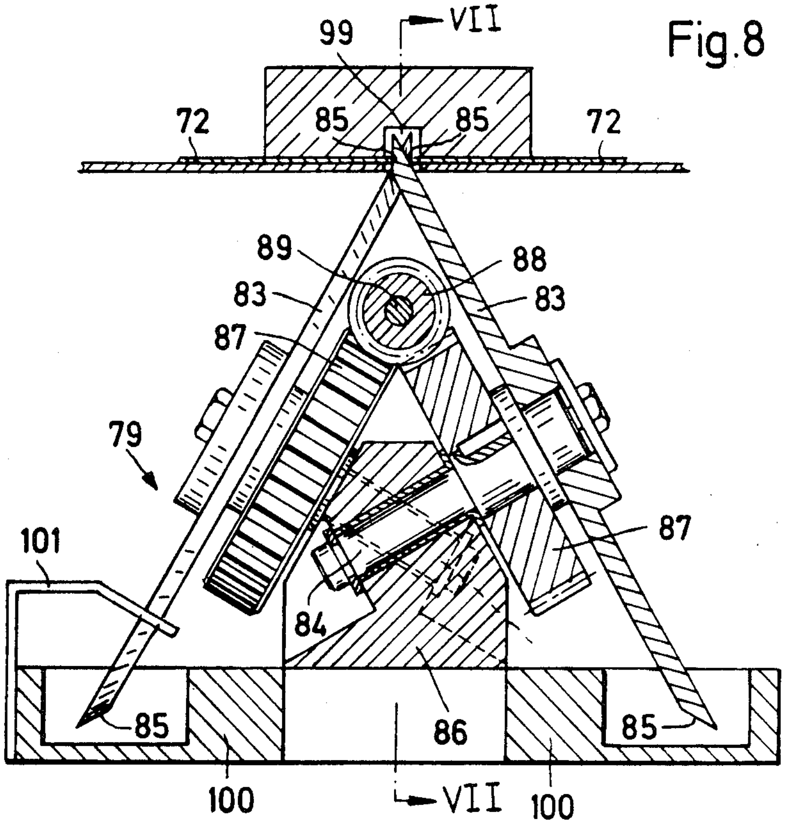
FIG. 8 is a cross-sectional view through the glue spreading device, taken along the line VIII—VIII of FIG. 7.
Figure 9:
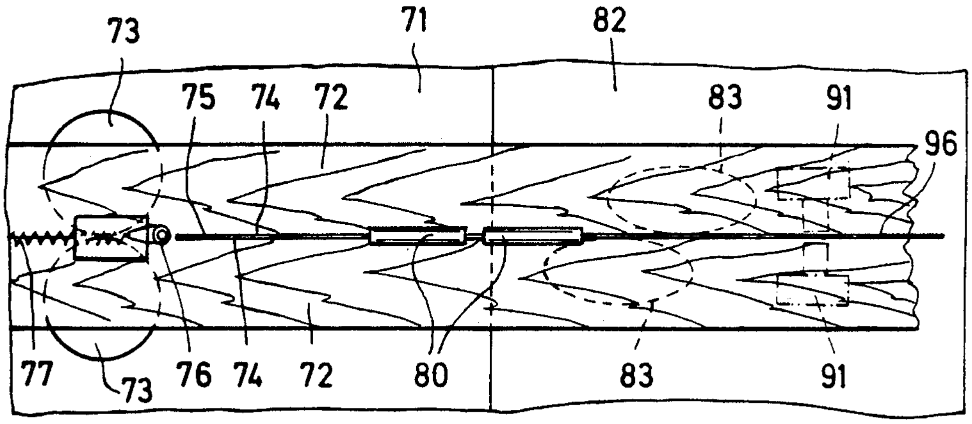
FIG. 9 is a plan view of two veneers which are to be joined together, showing conveyor discs which gather the veneers together by their butt edges, a feed device for supplying a connecting filament, and the glue spreading device which is provided with conveyor rollers, glue dispensing discs and hot air nozzles.

When viewed in the veneer conveying direction indicated by arrow "A" in FIG. 6, a spreading device 79, which applies glue to the lateral longitudinal edges (butt edges) 74, is disposed on the machine frame 70 in front of the guide rail 75, and at least one hot air nozzle 80 is provided behind this spreading device 79 when viewed in the veneer conveying direction.

The spreading device 79 has a housing 81 which is securable to the machine frame 70, the upper surface of said housing 81 forming a supporting surface 82 which extends horizontally relative to the supporting and conveying surface 71.

At least one, preferably two, glue dispensing discs 83 are disposed in the housing 81, and the rotational axles 84 of said discs 83 are disposed at an angle, preferably at an obtuse angle, to one another so that the two dispensing discs 83 are inclined (like a roof) relative to each other. The periphery of each dispensing disc 83 is chamfered and made into a dispensing surface 85 which extends inclinedly relative to the rotational axle 84 and comes into contact with a respective butt edge 74 of the veneer 72, and dispensing surface 85 extending perpendicular to the veneer supporting plane 82 in this contact region, thereby achieving a plane abutment between the dispensing surface 85 and veneer edge 74. When viewed in the veneer conveying direction, the two glue dispensing discs 83 are spaced at a specific distance one behind the other, whereby their glue dispensing surfaces 85, disposed one behind the other in the conveying direction, provide the two veneer butt edges 74 with glue.

The two glue dispensing discs 83 are rotatably mounted with their rotational axles 84 in a bearing block 86 of the housing 81, and a toothed wheel 87 is mounted on each rotational axle 84, said toothed wheel 87 meshing with a worm wheel 88. The two worm wheels 88 rest on a common, horizontal shaft 89 which extends in the veneer conveying direction and is also rotatably maintained in the bearing block 86, said shaft 89 being synchronised with the drive of the conveyor discs 73 by means of a transmission gear 90. When viewed in the conveying direction, two conveyor rollers 91 are mounted in the housing 81 in front of the dispensing discs 83 and are also driven by the drive of the conveyor disc 73 or by the shaft 89, said rollers 91 having their active surfaces protruding through recesses in the supporting surface 92 and conveying the veneers 72 past the dispensing discs 83. These lower conveyor rollers 91 co-operate with upper pressure rollers 92.

The upper, freely rotating pressure rollers 92 are rotatably mounted on a depressor 95 which is vertically pivotable about a horizontal axle 93 and is held against the traversing veneers 72 by means of weights 94 or springs or the like, said depressor 95 forming an abutment bar 96 for the veneers 72 at its front longitudinal end on the pivotal axle side, when viewed in the conveying direction, and forming, in conjunciton therewith, a pressure component 97 which is applied to these veneers.

At least one, preferably two or more hot air nozzles 80, is added behind the depressor 95, when viewed in the conveying direction, said nozzles 80 being mounted with their hot air supply pipes 98 on the machine frame 70 and extending with their nozzle length in the butt joint region in the longitudinal direction of the veneer butt edges 74, with the result that the nozzles 80 lie between the depressor 95 and the filament feed device 75. As a consequence thereof, the hot air stream passes between the butt edges 74 which are coated with glue, whereby the hot air preactivates the glue. The butt edges 74 are brought together by means of the guide rail 75.

In the region of the glue dispensing discs 83, the pressure component 97 of the depressor 95 has a groove 99, in which the dispensing discs 83 can engage with their dispensing surfaces 85, so that the entire thickness of the veneers 72 is held by the dispensing surfaces 85.

A glue container 100 (glue chamber) is provided for each dispensing disc 83 on the bearing block 86, and the respective dispensing disc 83 extends into said container 100 with its lower region remote from the veneers 72. Each dispensing disc 83 is provided with a scraper 101 which is mounted on the glue container 100 and meters the glue carried by the dispensing disc 83.

A white glue is preferably used as the glue and is known as so-called PVAC glue; it requires a long bonding time (hardening time), but advantageously takes up paints and varnishes.

Figure 10:
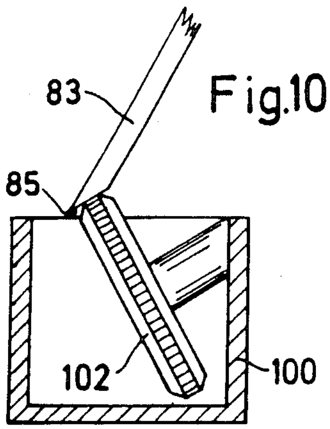
FIG. 10 is a cross-sectional view through a glue container having an additional spreading roller disposed therein, said roller supplying the glue to the glue dispensing disc.
Figure 11:
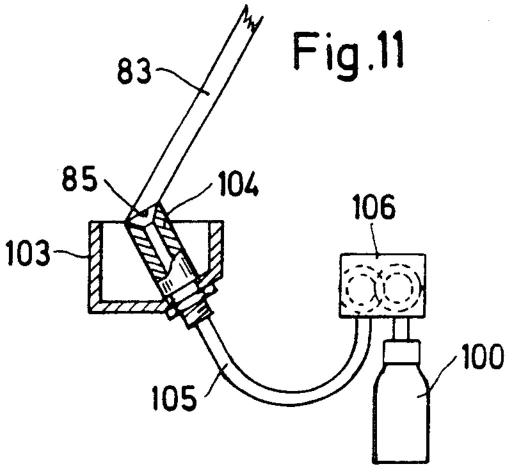
FIG. 11 is a cross-sectional view through a glue collecting vessel having a glue nozzle disposed therein, said glue nozzle supplying the glue to the glue dispensing disc and being connected to a glue container via a pump.

FIGS. 10 and 11 illustrate alternative means for dispensing glue to the dispensing discs 83. According to FIG. 10, an additional spreading roller 102 is rotatably mounted in the glue container 100, said roller 102 extending into the glue and dispensing the carried glue to the dispensing surface 85 of the dispensing disc 83.

According to FIG. 11, the glue container is the collecting vessel 103 which has a nozzle 104 disposed therein, said nozzle 104 transmitting the glue to the dispensing surface 85. The nozzle 104 is connected to a separate glue container 100 via a hose-pipe 105, or the like, and a pump 106, so that the glue is passed from the container 100 to the nozzle 104 by the pump 106. Surplus glue is received by the collecting vessel 103 or returned to the cycle.

Figure 12:
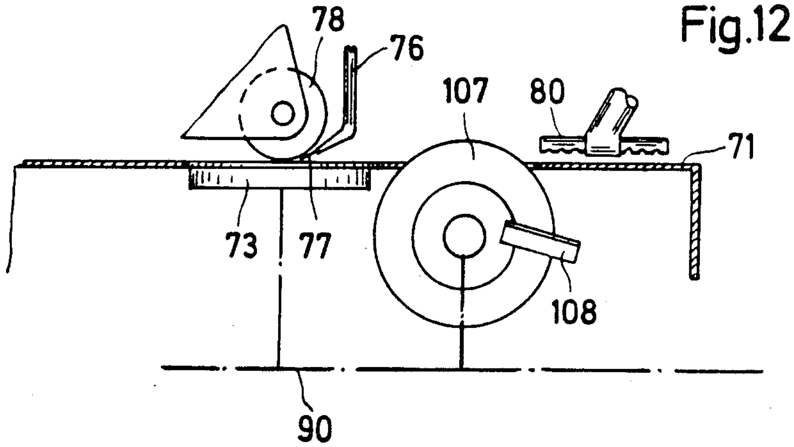
FIG. 12 is a side view of a guide bar in the form of a rotating disc.
Figure 13:
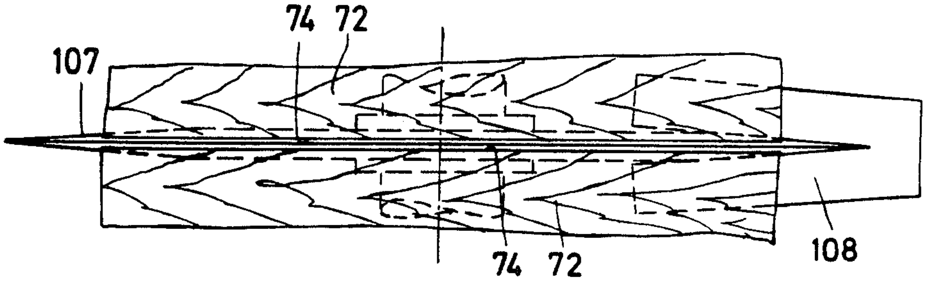
FIG. 13 is a plan view of two veneer strips, showing a guide disc which keeps the veneer strips spaced apart from one another.

FIG. 12 illustrates a rotating disc 107 which is disposed between the conveyor discs 73 and the hot air nozzles 80, instead of the guide rail 75, and the outer lateral walls of said disc 107 extend in a pointed manner. The glue-coated butt edges 74 of the veneers 72 are kept spaced apart at these lateral walls so that the glue can be partially activated by the hot air prior to the butt edges being pressed together. The butt edges 74 are subsequently pressed together by means of the conveyor or discus discs 73, and the connecting filament 77 is applied to the surface thereof. It is advantageous, therefore, to keep the pre-activated glue spaced apart with as few points of contact as possible. This is made possible by the rotating disc 107 with its outwardly pointed lateral walls, such disc effecting punctiform abutment with the butt edges 74 perpendicular to its rotational axle. It is additionally advantageous to treat the surface of the lateral walls so that there is virtually no possibility of the glue adhering thereto. For example, the surface may be polished or be coated with a layer of, for example, chromium, plastics material (Teflon) or the like. FIG. 13 of the drawing illustrates such puntiform contact between the butt edges 74 and the lateral walls of the rotating disc. In addition, lateral scrapers 108 may be mounted on the walls of the disc 107, and such scrapers 108 remove the adhering glue from the surface.

The veneer asembling machine according to the invention operates as follows: The two veneers 72 which are to be joined together are manually placed upon the supporting surface 82 of the spreading device 79, and their butt edges 74 are placed against the abutment rail 96 which determines the gap for allowing the dispensing discs 83 to enter the veneer butt region. The conveyor and pressure rollers 91, 92 then move the veneers 72 in the conveying direction past the dispensing discs 83 which, by means of their dispensing surfaces 85, supply glue to the veneer butt edges 74. The hot air of the hot air nozzles 80, disposed thereafter, acts upon the glue at the butt edges 74 and causes a certain amount of pre-hardening. Pre-hardening occurs, therefore, on the path between the dispensing discs 83 and the conveyor discs 73. The plate-shaped conveyor discs 73 then adopt the veneers 72 and firmly draw the veneers together by their butt edges. The feed device 76 applies the connecting filament 77, therefore, to the veneer surface in an undulatory or zigzag manner.

The connecting filament 77, which is adhered to the veneers 72 in the butt edge region by means of heat and pressure, keeps the veneers 72 close together and substantially forms a clamp (retaining force) which securely keeps the veneer edges 74, which are to be joined together, close together during the entire time required for the glue to harden.

The rotational movements of the conveyor and pressure rollers 91, 92, of the dispensing discs 83, of the guide discs 107 and of the conveyor discs 73, as well as the pivotal movement of the feed device 76, are synchronised and so adapted to one another that the veneers 72 are ensured a uniform passage. It is advantageous, therefore, to drive the component parts by means of a common drive, preferably the drive of the conveyor discs 73 which simultaneously form gathering discs, whereby the transmission means or gear types may be of different constructions.

The dispensing discs 83 may also be driven by means of bevel gears (not shown). In such case, the bevel gears are mounted at one end of the rotational axles 84 and mesh with the transmission gear 90, so that synchronous drive is also ensured.

We claim:

1. A machine for assembling veneer strips as they pass along a machine table in a conveying direction, said machine comprising a machine frame, conveying means mounted in the machine frame for gathering together veneer strips by their butt edges, said machine also comprising a feed device for supplying adhesive filament, said feed device applying an adhesive filament to the upper surface of gathered veneer strips in an undulatory or zigzag manner over the butt edge region, a glue spreading device which coats the lateral longitudinal butt edges of said veneer strips with glue, said spreading device being disposed on said machine frame in front of said filament feed device when viewed in the conveying direction of the veneer strips, and at least one hot air nozzle disposed behind said spreading device in front of said filament feed device, said glue spreading device including a lowerable tool carrier disposed on said machine frame beneath the machine table and being horizontally displaceable from an operating position in the region of said machine table at right angles to the conveying direction of the veneer strips, a pressure medium cylinder vertically retained on said machine frame, a rod extending vertically from said cylinder for selective extension and retraction relative thereto, said rod having a free upper end with a support element thereon, said tool carrier, in the operating position, being supported on the support element, two link parallelograms on said frame, each comprising a lower link rod and an upper link rod, said link parallelograms pivotally connecting said tool carrier to two slidably mounted horizontal connecting rods disposed at right angles to the conveying direction of the veneer strips.

2. A machine as recited in claim 1, in which each connecting rod is axially displaceably mounted in two sliding bushes which are retained by two fixed webs spaced one behind the other transversely to the conveying direction of the veneer strips, and said glue spreading device including two glue spreading discs each retained in said tool carrier and connected, via a gear mounted on said tool carrier and via a universal joint shaft, to a drive shaft - in the form of a splined shaft - which is rotatably and axially displaceably mounted on said webs.

3. A machine as recited in claim 2, wherein said tool carrier is connected to a vertical carrier plate at its side remote from said universal joint shaft, and a glue feed pump for each of the two glue spreading discs is mounted on said carrier plate, said feed pump being connected to the gear for the associated glue spreading disc via a drive shaft and a chain drive.

4. A machine as recited in claim 3, including a bearing sleeve mounting each glue spreading disc, each bearing sleeve being appropriately inserted into a bore in said tool carrier which is in the form of a solid, integral bearing body having inclined outer surfaces, each said sleeve being detachably secured in the bore, each said bearing sleeve having a flange disposed on its outer end, and seating adjacent an inclined outer surface of said bearing body, and said bearing sleeve is secured to said bearing body by means of a plurality of flange screws.

5. A machine as recited in claim 4, wherein the mounting of each glue spreading disc in the associated bearing sleeve is effected by means of a shaft disposed within said bearing sleeve and protruding therefrom, said glue spreading disc being mounted on the end of said shaft protruding from said bearing sleeve.

6. A machine as recited in claim 5, wherein a glue chamber is formed by the bearing body and each glue spreading disc in its lower peripheral region, said glue chamber being sealed by means of a sealing ring encircling said glue spreading disc, said glue feed pump having a pressure side and a suction side, a glue nozzle acting upon said glue spreading disc within each glue chamber and connected to the pressure side of the glue feed pump via a supply conduit disposed in said bearing body, the glue chamber being connected to the suction side of said glue feed pump via a discharge conduit, disposed in said bearing body, and a closed glue container connected downstream.

7. A machine as recited in claim 6, wherein said glue spreading discs, which are staggered one behind the other in the conveying direction of the veneer strips, are each connected to the respective gear via a horizontal shaft disposed in a bore in said bearing body and through a radial bore in the associated bearing sleeve into connected engagement, via bevel gears, with the shaft of the glue spreading disc within said bearing sleeve.

* * * * *